Patented July 25, 1944

2,354,552

UNITED STATES PATENT OFFICE 2,354,552

COLOR PHOTOGRAPHIC IMAGE

Wilhelm Schneider and Alfred Fröhlich, Dessau, and Walter Zeh, Wolfen, Germany, assignors to General Aniline & Film Corporation, New York, N. Y., a corporation of Delaware No Drawing. Application February 17, 1942, Serial No. 431,262. In Germany August 8, 1940

9 Claims. (Cl. 95—6)

The present invention relates to color photographic images, and more particularly to an improved photographic emulsion for color photography.

It has already been proposed for the production of color photographic images to use as dyestuff components for the red image 1-phenyl-5-pyrazolones containing radicals producing fastness to diffusion and groups rendering the components water-soluble. Such compounds are, for instance, 1-(phenyl-3'-sulfonic acid)- and 1-(phenyl-4'-sulfonic acid)-3-heptadecyl-5-pyrazolones.

We have found that as dyestuff formers for red such pyrazolones are especially advantageous as contain at least one acid group indirectly linked to the phenyl radical besides one or several radicals producing fastness to diffusion. Sulfo- and carboxyl groups are, for instance, suitable acid groups. Molecular groups connecting the acid groups with the phenyl radical are, for instance, alkylene and hydroxyalkylene groups.

The pyrazolones of the present invention may, for instance, be prepared by condensing phenylhydrazinealkylenesulfonic acids or phenylhydrazinehydroxyalkylenesulfonic acids which may, if necessary, carry further substituents with relatively high molecular weight acylacetic acid esters saturated or unsaturated. These phenylpyrazolones having acid groups indirectly linked thereto are distinguished from phenylpyrazolones having acid groups directly linked thereto by a better solubility in water and an increased fastness to diffusion and yield color images with a flatter gradation on color development with p-dialkylaminoanilines. These properties make the dyestuff formers of the present invention especially suitable for the production of the red component image in multi-color photography.

As radicals capable of producing fastness to diffusion the pyrazolones may contain any known substituent suitable therefor, (conf. for instance Stenger-Staude, Fortschritte der Photographie, volume II, 1940, pages 393-97).

The silver halide emulsions prepared by means of the dyestuff components of the present invention may be cast to form single layers or worked up into a multi-layer material containing further emulsion layers with dyestuff formers for the other component colors and, if necessary, filter layers, intermediate layers and anti-halation layers. The emulsion layers may contain corresponding sensitizers and be arranged on one or both sides of the support. The multi-layer material may also comprise emulsion layers capable of producing dyestuffs according to a color photographic method rather than that mentioned above. The color images may be obtained by a simple development or a reversal development as negatives or positives respectively.

The following examples illustrate the present invention but they are not intended to limit it thereto.

Example 1

10 g. of the sodium salt of 1-(phenyl-3'-methylene-$\omega$-sulfonic acid)-3-heptadecyl-5-pyrazolone are dissolved in 250 cc. of water while slightly heating. The solution obtained is added to 1 kilo of a silver halide gelatin emulsion before casting. After exposure a red dyestuff image having an absorption maximum at about 525 m$\mu$ is produced by treatment with a developer of the following composition:

| | |
|---|---|
| Potassium carbonate_____g__ | 75 |
| p-Dimethylaminoanilinesulfate _____g__ | 2.5 |
| Potassium bromide_____g__ | 2.5 |
| Sodium sulfite _____g__ | 0.5 |
| Water_____cc__ | 1000 | and subsequently dissolving the formed silver.

The pyrazolone mentioned above is obtained in the following manner: A mixture of $\tfrac{1}{10}$ mol of 3-phenylhydrazine-$\omega$-methylenesulfonic acid in an aqueous solution of acetic acid and $\tfrac{1}{10}$ mol of stearyl acetic acid ester in an alcoholic solution is boiled for half an hour. The pyrazolone thus formed precipitates on acidifying the mixture with hydrochloric acid, is recrystallized from methanol for purification and subsequently washed with acetone.

Example 2

10 g. of 1-(phenyl-4'-hydroxy-ethylene-$\omega$-sulfonic acid)-3-undecyl-5-pyrazolone are neutralized with $n/10$ sodium hydroxide solution and dissolved in water while gently warming. The solution thus obtained is made up with water to 250 cc. and added to one kilo of a silver halide gelatin emulsion before casting. The exposed emulsion is treated with a developer containing p-dimethylaminoaniline to form a dyestuff image. After the silver has been removed, a red dyestuff image having an absorption maximum at about 525 m$\mu$ remains.

The pyrazolone mentioned above is produced by condensing phenylhydrazine-4-(hydroxyethylene-$\omega$-sulfonic acid) with lauroylacetic acid ethylester in the manner as described in Example 1.

Example 3

10 g. of 1-(phenyl-4'-phenoxy-3'-methylene-ω-sulfonic acid)-3-heptadecyl-5-pyrazolone are neutralized with n/10 sodium hydroxide solution and dissolved in about 200 cc. of water with heating and then added to 1 kilo of silver halide gelatin emulsion before casting. On color development with a developer containing dimethylaminoaniline one obtains a slightly bluish red dyestuff image. The dyestuff exhibits a maximum absorption at about 530 mμ.

The pyrazolone mentioned above is prepared in the following way: 30 g. of 4-phenoxyphenylhydrazine-3-ω-methylene-sulfonic acid and 20 g. of sodium acetate are dissolved in 100 cc. of water with warming. To this mixture a warm solution of 35 g. of stearyl acetic acid ethylester in 100 cc. of propanol is added and the whole is then boiled for about 2 hours. The solution is subsequently diluted with 300 cc. of cold-saturated aqueous solution of sodium chloride and acidified with 100 cc. of concentrated hydrochloric acid. The pyrazolone precipitated is purified by recrystallization from about 1 liter of methanol and washed with acetone.

Instead of the sodium salts of the pyrazolones of the invention other soluble salts may also be used, especially other alkali metal salts.

We claim:

1. A silver halide emulsion for color forming development containing as the dyestuff former for red a soluble salt of 1-phenyl-5-pyrazolone containing in its molecule at least one water-solubilizing acid group aliphatically linked to said phenyl radical and at least one radical producing fastness to diffusion linked to said pyrazolone ring in 3-position.

2. A silver halide emulsion for color forming development containing as the dyestuff former for red the sodium salt of 1-(phenyl-3'-methylene-ω-sulfonic acid)-3 - heptadecyl - 5 - pyrazolone.

3. A silver halide emulsion for color forming development containing as the dyestuff former for red the sodium salt of 1-(phenyl-4'-hydroxyethylene-ω-sulfonic acid)-3 - undecyl - 5 - pyrazolone.

4. A silver halide emulsion for color forming development containing as the dyestuff former for red the sodium salt of 1-(phenyl-4'-phenoxy-3'-methylene-ω-sulfonic acid) - 3 - heptadecyl-5-pyrazolone.

5. A silver halide emulsion for color forming development containing as the dyestuff former for red a soluble salt of a 1-phenyl-5-pyrazolone containing in its molecule at least one water-solubilizing acid group linked to said phenyl radical by a group selected from the class consisting of alkylene and hydroxy-alkylene groups and containing at least one radical producing fastness to diffusion linked to said pyrazolone ring in 3-position.

6. A silver halide emulsion for color forming development containing as the dyestuff former for red, compounds of the following general formula:

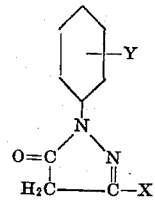

wherein X stands for a radical producing fastness to diffusion and Y stands for an aliphatically linked water-solubilizing acid group.

7. A silver halide emulsion as defined in claim 6 wherein Y stands for a water-solubilizing acid group linked to the phenyl radical by a group selected from the class consisting of alkylene and hydroxyalkylene groups.

8. The composition as defined in claim 6 wherein radical Y is linked to the phenyl radical by a methylene group.

9. The composition as defined in claim 6 wherein radical Y is linked to the phenyl radical by a hydroxyethylene group.

WILHELM SCHNEIDER.
ALFRED FRÖHLICH.
WALTER ZEH.